United States Patent
Cho

(10) Patent No.: US 7,665,386 B2
(45) Date of Patent: Feb. 23, 2010

(54) VEHICULAR BRAKE PEDAL STRUCTURE FOR PREVENTING INJURY

(75) Inventor: Yang-Rae Cho, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 613 days.

(21) Appl. No.: 11/156,297

(22) Filed: Jun. 17, 2005

(65) Prior Publication Data

US 2006/0055163 A1 Mar. 16, 2006

(30) Foreign Application Priority Data

Jun. 23, 2004 (KR) ...................... 10-2004-0047103

(51) Int. Cl.
*G05G 1/32* (2008.04)

(52) U.S. Cl. ...................................................... 74/512

(58) Field of Classification Search .................. 74/512, 74/513, 560; 180/271, 274, 281, 315, 316
See application file for complete search history.

(56) References Cited

U.S. PATENT DOCUMENTS

| | | | | |
|---|---|---|---|---|
| 5,327,797 A | * | 7/1994 | Seifrit, Jr. ..................... | 74/512 |
| 6,089,119 A | * | 7/2000 | Leboisne et al. ............... | 74/512 |
| 6,101,894 A | * | 8/2000 | Tiemann et al. ................ | 74/512 |
| 6,182,526 B1 | * | 2/2001 | Brooks ......................... | 74/512 |
| 6,339,971 B1 | * | 1/2002 | Kato ............................ | 74/512 |
| 6,655,489 B2 | * | 12/2003 | Kawai et al. ................. | 180/274 |
| 6,810,766 B2 | * | 11/2004 | Mizuma ....................... | 74/512 |
| 2003/0019683 A1 | * | 1/2003 | Hayashihara et al. ....... | 180/315 |
| 2004/0040409 A1 | * | 3/2004 | Nebuya et al. ................ | 74/560 |
| 2005/0050980 A1 | * | 3/2005 | Park ............................ | 74/512 |

FOREIGN PATENT DOCUMENTS

| | | |
|---|---|---|
| CN | 1468773 | 1/2004 |
| DE | 697 17 058 T2 | 1/2003 |
| DE | 697 14 652 T2 | 4/2003 |
| GB | 2 389 565 | 12/2003 |

* cited by examiner

*Primary Examiner*—Vicky A Johnson
(74) *Attorney, Agent, or Firm*—Morgan, Lewis & Bockius LLP

(57) ABSTRACT

A simply configured brake pedal is restricted in regression and pivot thereof in the event of a vehicle collision, thereby preventing or minimizing injury to a driver. The brake pedal structure for preventing injury includes a brake pedal mounting bracket, a blocking piece, a support bracket, and a blocking panel. A blocking piece is installed at a pedal arm of the brake pedal and protrudes out towards the rear of the vehicle. A recession limit means is equipped at a steering column mounting bracket connected to a cowl cross bar to restrict a backward shift of the blocking piece.

7 Claims, 3 Drawing Sheets

VEHICULAR BRAKE PEDAL STRUCTURE FOR PREVENTING INJURY

CROSS-REFERENCE TO RELATED APPLICATIONS

The present application is based on, and claims priority from, Korean Application Serial Number 10-2004-0047103, filed on Jun. 23, 2004, the disclosure of which is hereby incorporated by reference herein in its entirety.

FIELD OF THE INVENTION

The present invention relates generally to a brake pedal of a vehicle. More particularly, the present invention relates to a brake pedal structure adapted to prevent a driver from being injured by the brake pedal in a vehicle collision.

BACKGROUND OF THE INVENTION

In high speed vehicle collisions, the engine compartment can be pushed toward the vehicle compartment causing the brake pedal mounting portion and brake pedal to also simultaneously be pushed toward the driver. The brake pedal can then impact the driver, causing injuries to the driver's ankle.

In one scenario, during a collision, one end of the brake pedal mounting breaks and the brake pedal is pushed toward the driver. The brake pedal mounting bracket, which is randomly cut off, engages with a surrounding component, restricting the movement of the brake pedal mounting bracket so that only the brake pedal is pushed because of the recession of a booster. The brake pedal pivots against a hinge equipped at the brake pedal mounting bracket, doubling the impact and aggravating injury to the driver.

SUMMARY OF THE INVENTION

Embodiments of the present invention are provided to prevent injury to a driver due to a recession of the brake pedal during a vehicle collision.

A vehicular brake pedal structure for preventing injury includes a brake pedal mounting bracket for fixing a hinge of a brake pedal to the vehicle body. A blocking piece is installed at a pedal arm of the brake pedal and protrudes out towards the rear of the vehicle. A recession limit means is equipped at a steering column mounting bracket connected to a cowl cross bar to restrict a backward shift of the blocking piece.

DETAILED DESCRIPTION OF THE PREFERRED EMBODIMENTS

Figure 1:
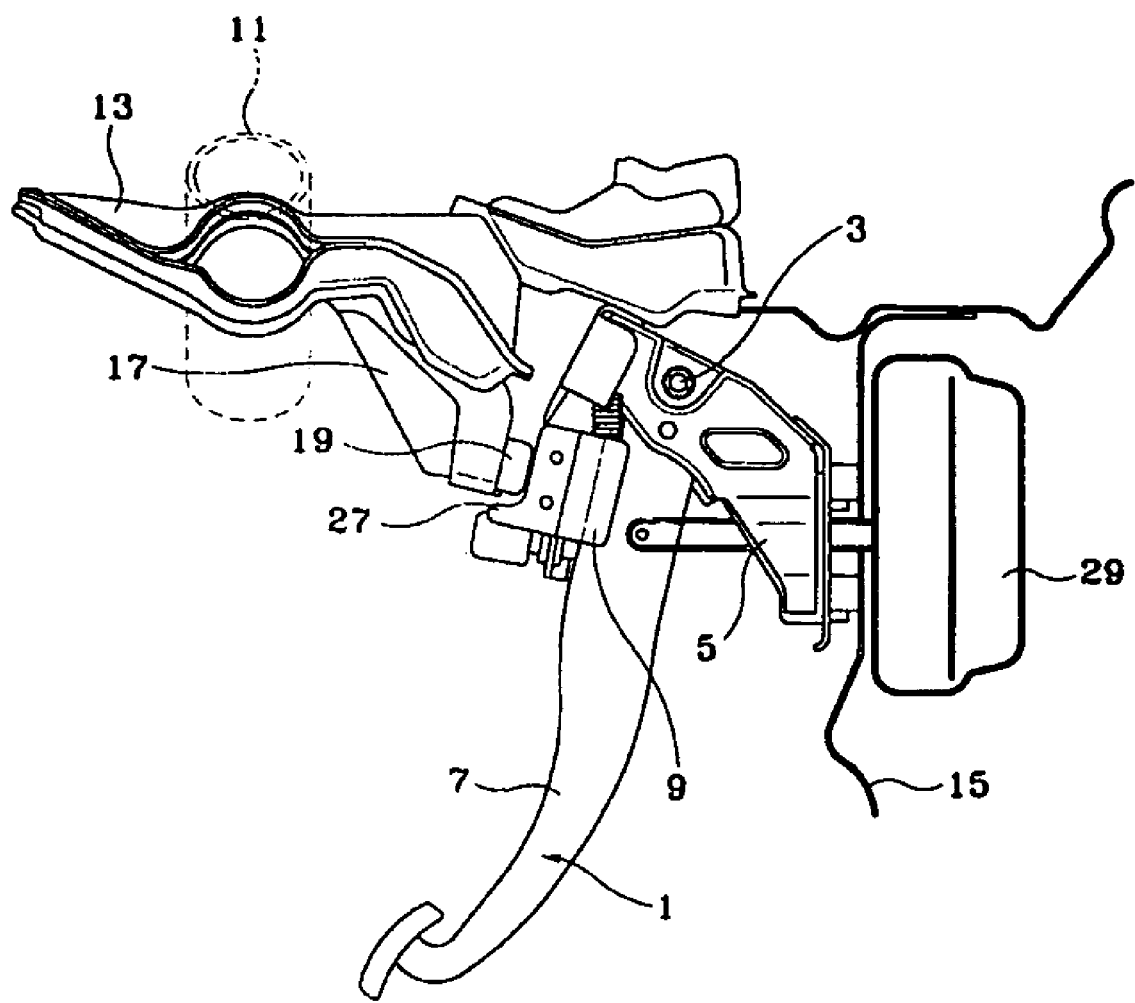
FIG. 1 depicts a vehicular brake pedal structure for preventing injury according to an embodiment of the present invention.
Figure 2:
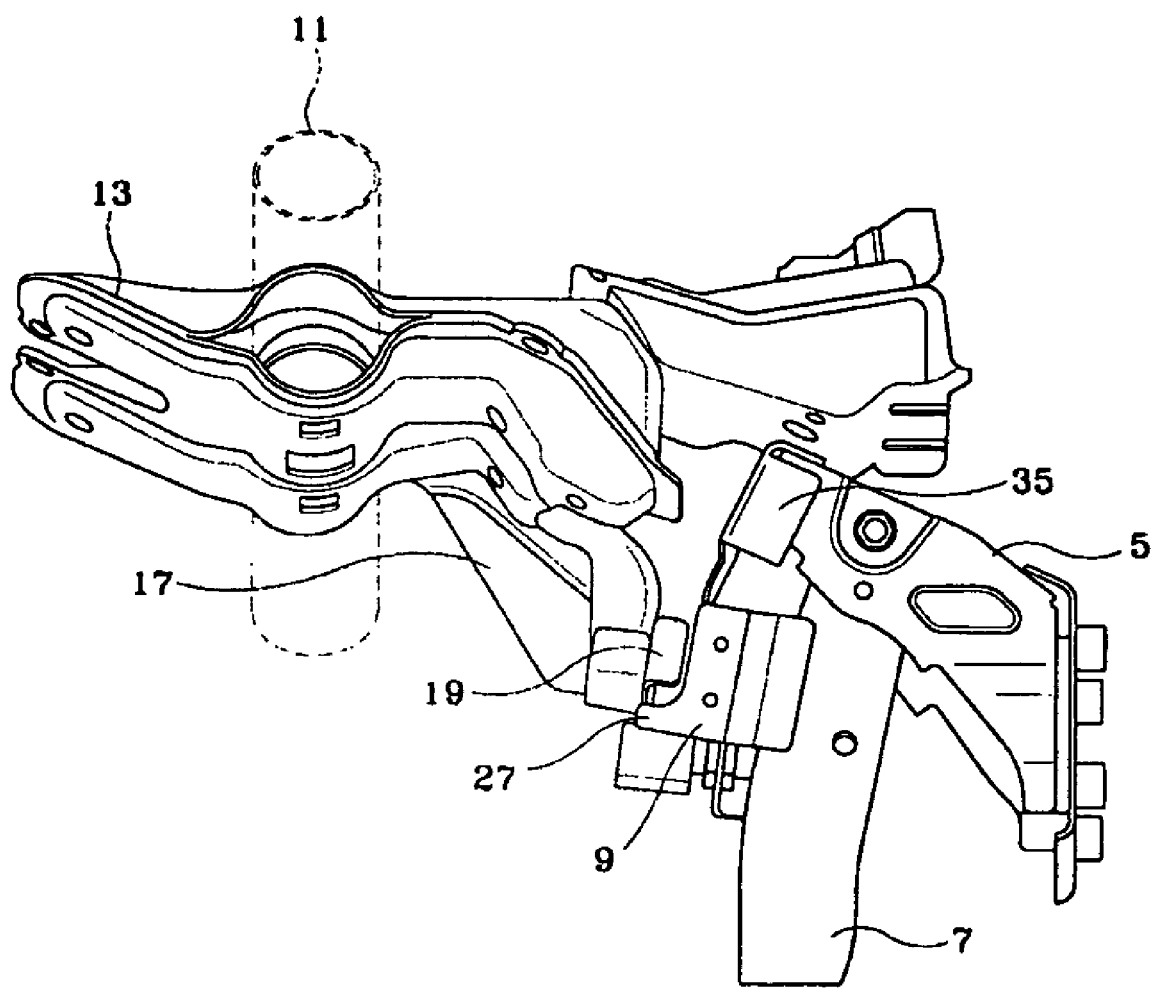
FIG. 2 is an enlarged view of the vehicle brake pedal structure of FIG. 1.
Figure 3:
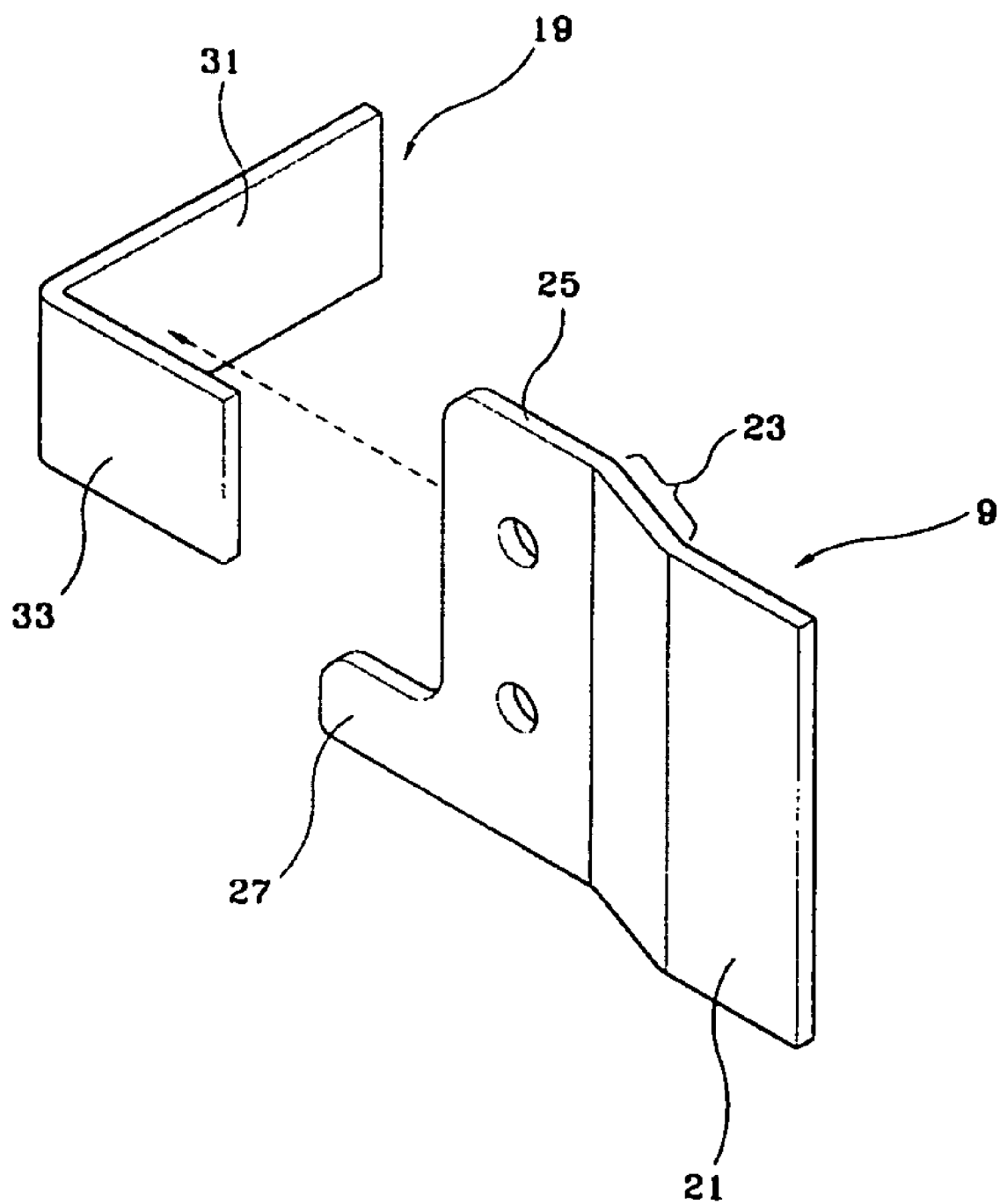
FIG. 3 illustrates a blocking piece and a blocking panel.

With reference to FIGS. 1 to 3, a vehicular brake pedal structure for preventing injury according to an embodiment of the present invention includes a brake pedal mounting bracket 5 for fixing a hinge 3 of a brake pedal 1 to the vehicle body. A blocking piece 9 is installed at a pedal arm 7 of the brake pedal 1 and protrudes out toward the rear of the vehicle. A recession limit means is installed at a steering column mounting bracket 13 connected to a cowl cross bar 11 to restrict a backward shift of the blocking piece 9.

The brake pedal mounting bracket 5 is secured to a dash panel 15 of the vehicle body. Thus, the hinge 3 of the brake pedal 1 is fixed in relation to the vehicle body. The steering column mounting bracket 13 secured at the cowl cross bar 11 fixes and firmly supports a steering column (not shown) in relation to the vehicle body.

The recession limit means is constituted by a support bracket 17 and blocking panel 19. The support bracket 17 is installed at the steering column mounting bracket to restrain the recession of the blocking piece 9 on a longitudinal axis of the vehicle. The blocking panel 19, which is mounted at the support bracket 17 facing blocking piece 9 is used to restrain a backward shift of the blocking piece 9.

The blocking piece 9 includes a mounting portion 21, bent portion 23, blocking portion 25, and blocking protrusion 27. The mounting portion 21 is mounted to the brake pedal 1. The bent portion 23 is obliquely bent from the mounting portion 21 towards an axis of the longitudinal direction of the vehicle. The blocking portion 25 is bent from the bent portion 23 to be parallel to the longitudinal direction of the vehicle and directly contacts the blocking panel 19. The blocking protrusion 27 is protrusively formed at a lower side of the blocking portion 25 toward the vehicle compartment.

The blocking piece 9 is placed at an upper portion of the pedal arm 7 of the brake pedal 1, more specifically, at a substantially similar height to a push rod of a booster 29 (directly below the hinge 3) and protrudes toward the inner side of the compartment.

The blocking panel 19 includes a blocking portion 31, which is perpendicular to the protruded direction of the blocking protrusion 27. A side portion 33 is bent from the blocking portion 31 toward the front direction of the vehicle. The blocking panel 19 is fixed at the support bracket 17 to face the blocking piece 9. The brake pedal mounting bracket 5 can have a smoothly curved structure on the side of the vehicle rear end.

Additionally, the vehicle rear end side of the brake pedal mounting bracket 5, which is randomly cut off, can be smoothly and inwardly bent. A rounding panel 35, which wraps around the rear end of the brake pedal mounting bracket 5, is equipped as shown in FIG. 2. All the corners of the rounding panel 35 are smoothly formed.

The operation of the embodiment of the present invention will now be described.

In the event of a vehicle collision, the engine room is pushed toward the passenger compartment as a result of the impact force. At the same time, the brake pedal mounting portion is also pushed toward the compartment. The blocking piece 9, which is mounted at an upper portion of the pedal arm 7 of the brake pedal 1, is engaged by the blocking panel 19 fixed to the steering column mounting bracket 13 via the support bracket 17 as illustrated in FIG. 2, thereby preventing a retreat of the brake pedal 1. When the engine compartment moves backward with a predetermined amount of force, the cowl cross bar 11 mounted at the steering column mounting bracket 13 is not deformed and functions as an ultimate supporter against recession of the brake pedal 1. Thus, the brake pedal 1 is prevented from receding during the backward movement of the engine compartment, thereby protecting the driver against injury.

The blocking protrusion 27 is protrusively formed at the blocking piece 9 and makes contact with the blocking portion 31 of the blocking panel 19 to restrain an upward pivot of the brake pedal 1 toward the driver. The side portion 33 of the blocking panel 19 prevents the separation of the blocking piece 9 from the blocking panel 19 during the recession of the brake pedal 1. Even if the brake pedal 1 is pushed toward the rear of the vehicle in an obliquely inclined position, the blocking piece 9 is restricted in movement via the blocking panel 19, thereby precluding a backward shift of the brake pedal 1.

In the conventional system, if the brake pedal mounting portion is excessively shifted backward due to a major collision, one end of the brake pedal mounting bracket 5 engages with neighboring components and ceases the regression movement. Then, the brake pedal 1 connected to the push rod pivots against the hinge 3, due to regression of the booster 29, causing severe injury to the driver. Therefore, one end of the brake pedal mounting bracket 5 is smoothly rounded in this embodiment of the present invention, and thus the brake pedal mounting bracket 5, together with the brake pedal 1 are pushed without being impeded by surrounding components. This prevents a pivot of the brake pedal 1 against the hinge 3 and reduces injury to the driver.

As apparent from the foregoing, there is an advantage in the simple configuration of the recession and pivot of the brake pedal in that it is restrained in the event of a vehicle collision, thereby preventing or minimizing injury to the driver.

While the foregoing description represent various embodiments of the present invention, it will be appreciated that the foregoing description should not be deemed limiting since additions, variations, modifications and substitutions may be made without departing from the spirit and scope of the present invention. It will be clear to one of skill in the art that the present invention may be embodied in other forms, structures, arrangements, and proportions and may use other elements, materials and components. The present disclosed embodiments are, therefore, to be considered in all respects as illustrative and not restrictive, the scope of the invention being indicated by the appended claims and not limited to the foregoing description.

What is claimed is:

1. A vehicular brake pedal structure for preventing injury, comprising:
   a brake pedal mounting bracket for fixing a hinge of a brake pedal to a vehicle body;
   a blocking piece that is installed on a pedal arm of said brake pedal and protrudes toward a rear end of the vehicle; and
   a recession limit means that is installed at a steering column mounting bracket connected to a cowl cross bar and selectively operable with the blocking piece of the pedal arm to restrict a backward shift of said blocking piece,
   wherein said blocking piece includes a blocking protrusion extending from a lower side thereof and toward a vehicle compartment, said blocking protrusion being displaced under a portion of the recession limit means.

2. The structure of claim 1, wherein said recession limit means includes:
   a support bracket that is installed at said steering column mounting bracket to restrain a recession of said blocking piece on a longitudinal axis of the vehicle; and
   a blocking panel that is installed at said support bracket to restrain a backward shift of said blocking piece.

3. The structure of claim 2, wherein said blocking panel includes a blocking portion being perpendicular to a protruded direction of said blocking protrusion.

4. The structure of claim 2 further comprising a side portion bent from a blocking portion toward a front direction of the vehicle.

5. The structure of claim 1, wherein said blocking piece includes:
   a mounting portion that is mounted at said brake pedal;
   a bent portion that is obliquely bent from said mounting portion along an axis of a longitudinal direction of the vehicle;
   a blocking portion that is bent from said bent portion to be parallel to the longitudinal direction of the vehicle and directly contacts said blocking panel; and
   said blocking protrusion that is protrusively formed at a lower side of said blocking portion toward a vehicle compartment.

6. The structure of claim 1, wherein a vehicle rear end of said brake pedal mounting bracket is curved.

7. The structure of claim 6, wherein the vehicle rear end of said brake pedal mounting bracket includes a curving panel wrapping around the vehicle rear end of said brake pedal mounting bracket.

* * * * *